May 12, 1925.
S. A. STAEGE
1,537,627
SPEED REGULATOR SYSTEM
Filed April 9, 1919
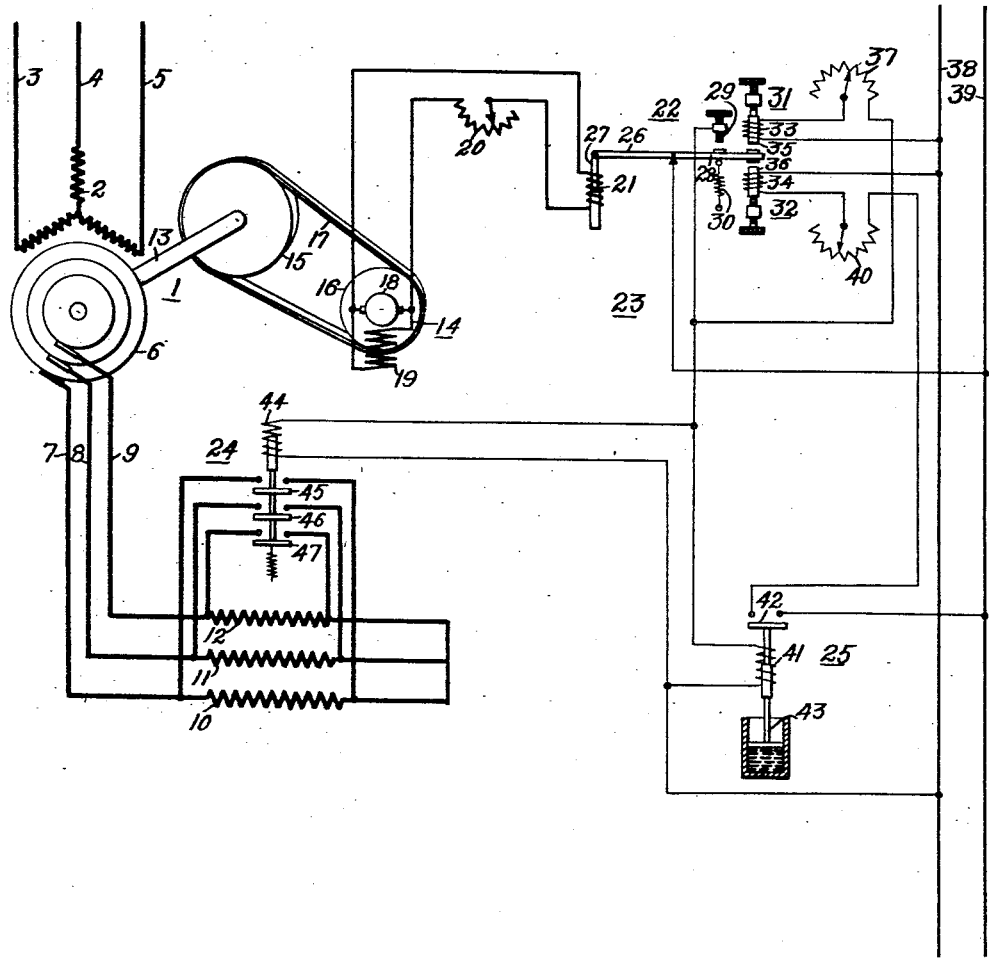
WITNESSES:
J. A. Helsel.
W. B. Wells
INVENTOR
Stephen A. Staege.
BY
Wesley J. Carr
ATTORNEY Patented May 12, 1925.

1,537,627

UNITED STATES PATENT OFFICE.

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA.

SPEED-REGULATOR SYSTEM.

Application filed April 9, 1919. Serial No. 288,709.

*To all whom it may concern:*

Be it known that I, STEPHEN A. STAEGE, a citizen of the United States, and a resident of Pittsburgh, in the county of Allegheny and State of Pennsylvania, have invented a new and useful Improvement in Speed-Regulator Systems, of which the following is a specification.

My invention relates to speed-regulator systems and particularly to speed-regulator systems for governing the operation of alternating current motors.

One object of my invention is to provide a regulating system that shall automatically maintain the speed of an induction motor substantially constant and be free from all so-called hunting action.

Another object of my invention is to provide an induction motor, having a wound rotor, with a regulator system that shall automatically vary the resistance of the rotor circuit in accordance with the speed of the induction motor to maintain the motor at a substantially constant speed.

In many industries, such, for example, as the paper-making industry, it is essential to operate certain machines at a substantially constant speed. In case a direct-current supply is available, the constant-speed machines may be operated by constant-speed, shunt-wound motors, but, in case only an alternating-current supply is available, considerable trouble may be experienced in operating the alternating-current motors at a constant speed, inasmuch as an alternating-current motor, for example, an induction motor, varies in speed in accordance with the changes in load, the voltage and the frequency of the supply circuit, and the temperature and resistance changes in the rotor circuit of the motor. Heretofore, it has been considered very undesirable and impractical to utilize induction motors for operating paper-making machines because of the variable, unstable speed of such motors, especially when operated as adjustable-speed motors and at speeds considerably below synchronous speed, which would cause a constant breaking of the paper passing through the machines and a great irregularity in the thickness and the weight of the sheet of paper, as well as a loss in production.

However, if a speed-regulator system, such as disclosed in my application, is applied to an induction motor, the motor may be automatically maintained at a substantially constant speed and may be utilized for driving adjustable-speed machines, such as the machines used in the paper industry.

In an inductor-motor, speed regulator system that is constructed in accordance with my invention, a small direct-current or magneto generator is operated by the induction motor and serves to govern a contact-making voltmeter in accordance with the speed of the induction motor. A relay is intermittently operated at various speeds by the contact-making voltmeter for short-circuiting resistors which are included in the circuit of the rotor winding, and a second relay is operated by the contact-making voltmeter for preventing overtravel or hunting action by the regulator. Moreover, an auxiliary electromagnet is generally associated with the contact-making voltmeter for preventing a chattering action thereof. It is to be understood, however, that such an auxiliary electromagnet is in no way essential to the operativeness of my system.

The single figure of the accompanying drawing is a diagrammatic view of a speed-regulator system embodying my invention.

Referring to the drawing, an induction motor 1, having a stator winding 2 connected to a three-phase supply circuit comprising conductors 3, 4 and 5 and a rotor 6, is provided for operating any suitable machines, such as adjustable-speed machines which are utilized in the paper-making industry. Three conductors 7, 8 and 9, which are connected to the winding of the rotor 6, are respectively provided with resistors 10, 11 and 12, which are short-circuited, under predetermined conditions, for a purpose to be set forth hereinafter. The conductors 7, 8 and 9 are connected to any suitable controller (not shown).

The rotor 6 of the induction motor 1, which drives the paper machines, is mounted upon a shaft 13 which is connected to a direct-current or magneto generator 14 by means of any suitable connection such, for example, as pulleys 15 and 16 and a flexible connector 17. The direct-current generator 14, which embodies an armature 18 and a field winding 19, is connected, through an adjustable resistor 20, to a winding 21 of a contact-making voltmeter 22. The voltmeter 22 is a portion of a regulator 23 which controls the speed of operation of the motor 1.

The regulator 23 embodies the contact-making voltmeter 22, a switch 24, which serves to short-circuit the rotor resistors 10, 11 and 12, under predetermined conditions, and a slow-acting relay 25 which is adapted to prevent overtravel or hunting action by the regulator.

The contact-making voltmeter 22 embodies a contact arm 26 that is pivotally connected to a core member 27 which is associated with the winding 21. The contact arm 26 is provided with a contact member 28 which is adapted to engage an adjustable contact member 29, when in a raised position, and an adjustable spring 30 which serves to counterbalance the weight of the core member 27 less the pull of coil 21, so that lever 26 will occupy a horizontal position when the speed is at any normal, predetermined value.

Two electromagnets 31 and 32, respectively comprising windings 33 and 34 and adjustable core members 35 and 36, are located upon opposite sides of one end of the contact arm 26. The electromagnet 31, which is connected, through an adjustable resistor 37, to an auxiliary supply circuit comprising conductors 38 and 39 whenever the contact members 28 and 29 of the contact-making voltmeters are in engagement with each other, is adapted to prevent a chattering action by the contact arm 26. The action of the electromagnet 31 upon the contact arm 26 may be regulated by adjusting the resistor 37. The winding 34 of the electromagnet 32 is connected, by means of the relay 25, through an adjustable resistor 40, across the supply conductors 38 and 39 for opposing the action of the winding 21, under predetermined conditions, to prevent overtravel or hunting action by the regulator.

The winding 34, when energized, changes the setting of the contact-making voltmeter 22 in a manner to effect the separation of the contact members 28 and 29 just previous to the operating of the motor at normal speed.

The relay 25 embodies a winding 41, which is adapted to be connected across the supply conductors 38 and 39 by means of the contact-making voltmeter 22, a switch member 42 which serves to complete the energizing circuit of the electromagnet 32, and an adjustable dash-pot 43 which governs the speed of operation of the relay.

The switch 24 embodies a winding 44, which is connected across the supply conductors 38 and 39 by means of the contact-making voltmeter 22, three switch members 45, 46 and 47, which are respectively adapted to short-circuit the rotor resistors 10, 11 and 12.

It should be noted, in considering the operation of the speed regulator, that the induction motor 1 is adjusted for operation at any desired speed by means of a hand-operated controller (not shown) and that the regulator serves solely for maintaining the speed of the induction motor at the particular speed to which it has been set by means of the hand-operated controller. It has been deemed inadvisable to completely illustrate the operation of the motor 1 by the controller, inasmuch as my invention relates solely to the automatic maintenance of the induction motor at the speed to which it has been set by means of the hand-operated controller.

Assuming the resistor 20 to be adjusted in accordance with the speed at which it is desired to operate the induction motor 1, and the induction motor to be operating below normal speed, then the voltage generated by the direct-current generator 14 will be reduced below normal value. Upon reduction of the voltage generated by the direct-current generator 14, the strength of the winding 21 of the contact-making voltmeter 22 is reduced to such point that it will permit the closing of the contact members 28 and 29.

Upon closing of the contact members 28 and 29, a circuit is completed through the winding 33 of the electromagnet 31 for preventing a chattering action of the contact arm 26, and a second circuit is completed through the windings 44 and 41 of the switch 24 and of the relay 25. Thereupon, the switch 24 is operated for short-circuiting the resistors 10, 11 and 12 to thus effect an increase in the speed of the motor 1. The relay 25, which is rendered slow-operating by means of the dash-pot 43, is adapted to complete a circuit for operating the electromagnet which opposes coil 21, thereby tending to separate the contact members 28 and 29 when the speed of the motor 1 has approached closely its normal value. As soon as the contact members 28 and 29 are separated, the switch 24 is released to break the short-circuits around the resistors 10, 11 and 12 and thus prevent further acceleration of the motor 1. However, owing to the time lag of the regulator parts and the inertia of the system, the motor 1 will continue to accelerate, bringing its speed to normal value.

In case the motor has not reached its normal speed by the time the short-circuiting switch members 45, 46 and 47 have opened the short-circuits around the resistors 10, 11 and 12, then the contact-making voltmeter 22 is again operated to short-circuit the rotor resistors 10, 11 and 12 and again increase the speed of the induction motor by a small increment. The cycle of operation, as above outlined, will continue to be repeated continuously. The rapidity of the action of the regulator will depend upon the inertia of the system and the extent of changes of load, frequency, voltage and temperature, and upon the closeness of regulation required.

In regard to the rotor resistors 10, 11 and 12, it may be noted that the value of these resistors should be sufficient to control the speed of the motor 1 between the widest ranges of load change, temperature change, and frequency and voltage changes that are liable to occur.

Modifications in the system and in the arrangement and location of parts may be made within the spirit and scope of my invention and such modifications are intended to be covered by the appended claims.

I claim as my invention:

1. In a speed-regulator system for an induction motor having a wound rotor and a plurality of resistors located in the circuit of the rotor, a contact-making voltmeter, means for operating said contact-making voltmeter in accordance with the speed of the motor, means comprising a switch controlled by said voltmeter for quickly establishing a short-circuit around said resistors, and means for preventing a hunting action by the regulator.

2. In a speed-regulator system for an induction motor, a main control electromagnet operated in accordance with the speed of the motor, means controlled by the electromagnet for maintaining the speed of the motor substantially constant, and means comprising a slow-acting relay controlled by the electromagnet for preventing a hunting action by the regulator.

3. The combination with an induction motor having resistors located in the rotor winding thereof, and a generator operated in accordance with the speed of said motor, of a main control magnet operated by said generator, means, comprising a switch operated by said magnet, for establishing a short-circuit around said resistors, under predetermined condition, to maintain the speed of the motor substantially constant, and means for opposing the action of said magnet to prevent hunting action.

4. In combination, an induction motor, a contact-making voltmeter, means for operating said voltmeter in accordance with the speed of the motor, means, comprising a switch automatically controlled by said contact-making voltmeter, for directly varying the motor circuit to maintain the speed of the motor substantially constant, and means for changing the setting of said voltmeter to prevent hunting action.

5. The combination with an induction motor having a plurality of resistors in circuit therewith, a generator operated by said motor, a contact-making voltmeter operated by said generator, and means operated by said voltmeter for short-circuiting said resistors, of means for preventing a chattering action and means for preventing hunting action by the voltmeter.

6. The combination with an induction motor having a wound rotor, resistors disposed in the circuit of said rotor winding, a generator operated by the motor, and a contact-making voltmeter operated in accordance with the voltage of the generator, of a relay controlled by said voltmeter for short-circuiting said resistors to govern the speed of said motor, and means, comprising a second relay governed by the voltmeter, for preventing a hunting action by the voltmeter.

7. In a regulator, the combination with a contact-making instrument, and an electromagnet associated with said instrument to prevent a chattering action by it, of a relay controlled by the instrument, and an electromagnet governed by said relay for preventing a hunting action by the contact-making instrument.

8. The combination with an induction motor having a plurality of resistors in circuit therewith, a generator operated by said motor, and a contact-making voltmeter operated by said generator, of means controlled by said voltmeter for short-circuiting said resistors, and means co-operating with said voltmeter for preventing a chattering action thereby, and means opposing the action of said last-mentiond means and adapted to prevent a hunting action by said voltmeter.

In testimony whereof, I have hereunto subscribed my name this 28th day of March 1919.

STEPHEN A. STAEGE.